(12) United States Patent
Bhatnagar et al.

(10) Patent No.: US 8,759,236 B2
(45) Date of Patent: Jun. 24, 2014

(54) POLYOLEFIN FIBER REINFORCED RUBBER

(75) Inventors: Ashok Bhatnagar, Richmond, VA (US); David S. Cordova, Laytonsville, MD (US)

(73) Assignee: Honeywell International Inc., Morristown, NJ (US)

(*) Notice: Subject to any disclaimer, the term of this patent is extended or adjusted under 35 U.S.C. 154(b) by 1382 days.

(21) Appl. No.: 11/526,353

(22) Filed: Sep. 25, 2006

(65) Prior Publication Data

US 2010/0239810 A1  Sep. 23, 2010

(51) Int. Cl.
| | |
|---|---|
| B32B 27/04 | (2006.01) |
| B32B 27/12 | (2006.01) |
| B32B 27/02 | (2006.01) |
| B32B 5/26 | (2006.01) |
| B32B 25/10 | (2006.01) |
| F41H 1/02 | (2006.01) |
| F41H 1/04 | (2006.01) |
| F41H 5/00 | (2006.01) |
| F41H 5/02 | (2006.01) |
| F41H 5/08 | (2006.01) |
| B29C 51/00 | (2006.01) |

(52) U.S. Cl.
USPC ........... 442/135; 442/134; 442/164; 442/171; 442/268; 442/277; 442/280; 442/293; 442/399; 428/911; 2/2.5; 89/36.01; 89/36.02; 89/36.05; 264/134; 264/319

(58) Field of Classification Search
USPC ......... 442/134, 135, 164, 171, 268, 277, 280, 442/293, 399; 428/911; 89/36.01, 36.02, 89/36.05; 2/2.5; 264/257–260
See application file for complete search history.

(56) References Cited

U.S. PATENT DOCUMENTS

| | | | | |
|---|---|---|---|---|
| 4,623,574 | A | * | 11/1986 | Harpell et al. ................ 428/113 |
| 4,631,225 | A | | 12/1986 | Nishimura .................... 428/250 |
| 4,650,710 | A | | 3/1987 | Harpell et al. |
| 4,820,568 | A | * | 4/1989 | Harpell et al. ................ 428/113 |
| 5,173,138 | A | | 12/1992 | Blauch et al. |
| 5,198,280 | A | * | 3/1993 | Harpell et al. ................ 428/102 |
| 5,480,706 | A | | 1/1996 | Li et al. ......................... 428/113 |
| 5,552,208 | A | | 9/1996 | Lin et al. |
| 5,677,029 | A | * | 10/1997 | Prevorsek et al. ............ 428/113 |
| 5,789,327 | A | * | 8/1998 | Rousseau ...................... 442/135 |
| 5,943,694 | A | * | 8/1999 | Moureaux et al. ................ 2/2.5 |
| 6,127,291 | A | * | 10/2000 | Coppage et al. .............. 442/135 |
| 6,642,159 | B1 | | 11/2003 | Bhatnagar et al. ............ 442/134 |
| 7,288,493 | B2 | * | 10/2007 | Bhatnagar et al. ............ 442/134 |
| 2003/0228815 | A1 | | 12/2003 | Bhatnagar et al. |
| 2004/0203304 | A1 | | 10/2004 | Almonacil et al. ............. 442/59 |
| 2005/0176320 | A1 | | 8/2005 | Holland et al. ................. 442/59 |

FOREIGN PATENT DOCUMENTS

| | | |
|---|---|---|
| CA | 766194 A | 8/1967 |
| CA | WO0214588 | 2/2002 |
| WO | WO2007084104 | 7/2007 |

OTHER PUBLICATIONS

Nonwoven, definition by Textile Glossary, Celanese Actetate, copyright 2001.*
Morton, "Elastomer, Synthetic, Survey"; Kirk-Othmer Encyclopedia of Chemical Technology, Copyright John Wiley &Sons Inc. 2001, published online Sep. 2009.*

* cited by examiner

Primary Examiner — Jennifer A Steele

(57) ABSTRACT

Rubberized polyolefin fabrics, particularly rubberized polyolefin fiber containing fabrics and a method for vulcanizing rubber without melting or lowering the performance of the fibers. A plurality of fibrous layers are molded and rubberized under high pressures, producing fabrics having customized stiffness properties.

53 Claims, No Drawings

POLYOLEFIN FIBER REINFORCED RUBBER

BACKGROUND OF THE INVENTION

1. Field of the Invention

This invention relates to rubberized high-strength polyolefin fiber containing fabrics. More particularly, the invention pertains to rubberized high-strength polyethylene fiber containing fabrics and a method for vulcanizing rubber without melting or lowering the performance of the high-strength polyolefin fibers.

2. Description of the Related Art

Ballistic resistant articles containing high-strength fibers that have excellent properties against deformable projectiles are known. Articles such as bullet resistant vests, helmets, vehicle panels and structural members of military equipment are typically made from fabrics comprising high-strength fibers. High-strength fibers conventionally used include polyethylene fibers, para-aramid fibers such as poly(phenylene-diamine terephthalamide), graphite fibers, nylon fibers, glass fibers and the like. For many applications, such as vests or parts of vests, the fibers may be used in a woven or knitted fabric. For many of the other applications, the fibers are encapsulated or embedded in a matrix material to form either rigid or flexible fabrics.

Various ballistic resistant constructions are known that are useful for the formation of articles such as helmets, panels and vests. For example, U.S. Pat. Nos. 4,403,012, 4,457,985, 4,613,535, 4,623,574, 4,650,710, 4,737,402, 4,748,064, 5,552,208, 5,587,230, 6,642,159, 6,841,492, 6,846,758, all of which are incorporated herein by reference, describe ballistic resistant composites which include high-strength fibers made from materials such as extended chain ultra-high molecular weight polyethylene. These composites display varying degrees of resistance to penetration by high speed impact from projectiles such as bullets, shells, shrapnel and the like.

In view of the desirable physical properties of high-strength fibers, such fibers have also been found to be useful in non-ballistic applications. For example, in 2005, the Goodyear Tire & Rubber Co. began manufacturing high performance tires wherein strands of a nylon-Kevlar® hybrid fiber were woven into a layer of rubber that is wrapped around a tire's steel treads. It is also well known to employ rubberized non-ballistic resistant grade fibers for a variety of commercial applications. For example, it is well known to utilize rubberized canvas for the manufacture of items such as hoses, bags, raincoats and ground coverings. However, it has been heretofore unknown to produce rubberized ballistic-resistant fabrics and articles formed from high-strength polyethylene fibers, particularly high-strength Spectra® polyethylene fibers. Ounce-for-ounce, Spectra® high performance polyethylene fibers, manufactured by Honeywell International, Inc. of Morristown, N.J., are ten times stronger than steel and 40% stronger than Kevlar®, while also light enough to float on water. The fibers also possess other key properties, including resistance to impact, moisture, abrasion chemicals and puncture. Accordingly, the present invention provides rubberized polyethylene fabrics which offer a significant physical improvement over rubberized fabrics of the related art.

SUMMARY OF THE INVENTION

The invention provides a rubberized, molded ballistic resistant fabric comprising a plurality of woven fibrous layers comprising polyolefin fibers or a plurality of non-woven fibrous layers comprising polyolefin fibers, or a combination of at least one woven fibrous layer and at least one non-woven fibrous layer of polyolefin fibers; said fabric having a stiffness of at least about 10 ksi as measured by ASTM D790; and said polyolefin fibers having a tenacity of about 7 g/denier or more and a tensile modulus of about 150 g/denier or more; said fabric having a rubber composition on at least one surface thereof.

The invention also provides a method of forming a rubberized, ballistic resistant fabric comprising:

i) applying a layer of an unvulcanized rubber composition onto at least one surface of a ballistic resistant fabric, said fabric comprising a plurality of woven fibrous layers comprising polyolefin fibers or a plurality of non-woven fibrous layers comprising polyolefin fibers, or a combination of at least one woven fibrous layer and at least one non-woven fibrous layer of polyolefin fibers; said polyolefin fibers having a tenacity of about 7 g/denier or more and a tensile modulus of about 150 g/denier or more;

ii) molding said fabric under sufficient heat and pressure to vulcanize said rubber composition and to produce a rubberized fabric having a stiffness of at least about 10 ksi as measured by ASTM D790.

The invention further provides a method of forming a rubberized, ballistic resistant fabric comprising:

i) positioning a vulcanized rubber layer onto at least one surface of a ballistic resistant fabric, said fabric comprising a plurality of woven fibrous layers comprising polyolefin fibers or a plurality of non-woven fibrous layers comprising polyolefin fibers, or a combination of at least one woven fibrous layer and at least one non-woven fibrous layer of polyolefin fibers; said polyolefin fibers having a tenacity of about 7 g/denier or more and a tensile modulus of about 150 g/denier or more; and ii) molding said fabric under sufficient heat and pressure to attach said vulcanized rubber layer to said ballistic resistant fabric and to thereby produce a rubberized fabric having a stiffness of at least about 10 ksi as measured by ASTM D790.

The invention still further provides a method of forming a rubberized, ballistic resistant fabric comprising:

positioning a vulcanized rubber layer onto at least one surface of a molded ballistic resistant fabric, said fabric comprising a plurality of woven fibrous layers comprising polyolefin fibers or a plurality of non-woven fibrous layers comprising polyolefin fibers, or a combination of at least one woven fibrous layer and at least one non-woven fibrous layer of polyolefin fibers; said polyolefin fibers having a tenacity of about 7 g/denier or more and a tensile modulus of about 150 g/denier or more; and wherein said rubberized, molded fabric has a stiffness of at least about 10 ksi as measured by ASTM D790.

DETAILED DESCRIPTION OF THE INVENTION

The invention presents a rubberized, molded ballistic resistant fabric comprising a plurality of woven fibrous layers, a plurality of non-woven fibrous layers, or a combination of at least one woven fibrous layer and at least one non-woven fibrous layer, which fabric layers comprise high-strength, polyolefin fibers. The rubberized fabric has a rubber composition on at least one surface of said fabric. For the purposes of the invention, fabrics having superior ballistic penetration resistance describe those which exhibit excellent properties against deformable projectiles.

As used herein, a "fiber" is an elongate body the length dimension of which is much greater than the transverse dimensions of width and thickness. The cross-sections of fibers for use in this invention may vary widely. They may be circular, flat or oblong in cross-section. Accordingly, the term fiber includes filaments, ribbons, strips and the like having regular or irregular cross-section. They may also be of irregular or regular multi-lobal cross-section having one or more regular or irregular lobes projecting from the linear or longitudinal axis of the fibers. It is preferred that the fibers are single lobed and have a substantially circular cross-section.

As used herein, a "yarn" is a strand of interlocked fibers. A "parallel array" describes an orderly parallel arrangement of fibers or yarns. A fiber "layer" describes a planar arrangement of woven or non-woven fibers or yarns. A fiber "network" denotes a plurality of interconnected fiber or yarn layers. A fiber network can have various configurations. For example, the fibers or yarn may be formed as a felt or another woven, non-woven or knitted, or formed into a network by any other conventional technique. In general, a "fabric" may relate to either a woven or non-woven material, or a combination thereof. As used herein, the term "fabric" describes structures including multiple fibrous layers either before or after molding to form a composite.

As used herein, a "high-strength, high tensile modulus fiber" is one which has a preferred tenacity of at least about 7 g/denier or more, a preferred tensile modulus of at least about 150 g/denier or more, both as measured by ASTM D2256 and preferably an energy-to-break of at least about 8 J/g or more. As used herein, the term "denier" refers to the unit of linear density, equal to the mass in grams per 9000 meters of fiber or yarn. As used herein, the term "tenacity" refers to the tensile stress expressed as force (grams) per unit linear density (denier) of an unstressed specimen. The "initial modulus" of a fiber is the property of a material representative of its resistance to deformation. The term "tensile modulus" refers to the ratio of the change in tenacity, expressed in grams-force per denier (g/d) to the change in strain, expressed as a fraction of the original fiber length (in/in).

The high-strength, high tensile modulus polyolefin fiber materials utilized herein preferably comprise extended chain polyolefin fibers, such as highly oriented, high molecular weight polyethylene fibers, particularly ultra-high molecular weight polyethylene fibers, and ultra-high molecular weight polypropylene fibers. Preferred fibers are extended chain polyethylenes having molecular weights of at least 500,000, preferably at least one million and more preferably between two million and five million. Such extended chain polyethylene (ECPE) fibers may be grown in solution spinning processes such as described in U.S. Pat. No. 4,137,394 or U.S. Pat. No. 4,356,138, which are incorporated herein by reference, or may be spun from a solution to form a gel structure, such as described in U.S. Pat. Nos. 4,551,296 and 5,006,390, which are also incorporated herein by reference. The most preferred polyethylene fibers for use in the invention are high-strength, high tensile modulus polyethylene fibers sold under the trademark Spectra® from Honeywell International Inc. Spectra® fibers are well known in the art and are described, for example, in commonly owned U.S. Pat. Nos. 4,623,547 and 4,748,064 to Harpell, et al.

As stated above, a high-strength, high tensile modulus fiber is one which has a preferred tenacity of about 7 g/denier or more, a preferred tensile modulus of about 150 g/denier or more and a preferred energy-to-break of about 8 J/g or more, each as measured by ASTM D2256. In the preferred embodiment of the invention, the tenacity of the fibers should be about 15 g/denier or more, preferably about 20 g/denier or more, more preferably about 25 g/denier or more and most preferably about 30 g/denier or more. The fibers of the invention also have a preferred tensile modulus of about 300 g/denier or more, more preferably about 400 g/denier or more, more preferably about 500 g/denier or more, more preferably about 1,000 g/denier or more and most preferably about 1,500 g/denier or more. The fibers of the invention also have a preferred energy-to-break of about 15 J/g or more, more preferably about 25 J/g or more, more preferably about 30 J/g or more and most preferably have an energy-to-break of about 40 J/g or more. These combined high strength properties are obtainable by employing well known solution grown or gel fiber processes. U.S. Pat. Nos. 4,413,110, 4,440,711, 4,535,027, 4,457,985, 4,623,547 4,650,710 and 4,748,064 generally discuss the preferred high strength, extended chain polyethylene fibers employed in the present invention, and their disclosures are incorporated herein by reference.

As stated herein, the rubberized fabrics of the invention include a plurality of fibrous layers and may comprise one or more woven or non-woven fibrous layers, or a combination thereof. The woven and non-woven fibrous layers of the invention may be formed using techniques that are commonly known in the art. Suitable non-woven fibrous layers include those comprising randomly oriented fibers, as with a felt, and a plurality of fibers or yarns arranged in a substantially parallel array. In a common construction, the non-woven fibrous layers of the invention comprise a single-layer, consolidated network of fibers in an elastomeric or rigid polymer composition, referred to in the art as a matrix composition. In general, a "matrix composition" is a binder material that binds the fibers together after a consolidation or lamination step. A "consolidated network" describes a consolidated combination of multiple fiber layers with the matrix composition. As used herein, a "single layer" structure refers to structure composed of one or more individual fiber layers that have been consolidated into a single unitary structure, wherein consolidation can occur via drying, cooling, heating, pressure or a combination thereof. The consolidated network may also comprise a plurality of yarns that are coated with such a matrix composition, formed into a plurality of layers and consolidated into a single fabric layer.

In either a random or parallel non-woven parallel orientation, the individual fibers forming the fabric layer may or may not be coated on, impregnated with, embedded in, or otherwise applied with a matrix composition, using well known techniques in the art. The matrix composition may be applied to the high strength fibers either before or after the layers are formed, then followed by consolidating the matrix material-fibers combination together to form a multilayer complex. Most particularly, the non-woven fibrous layers of the invention comprise: i) a plurality of layers, each layer comprising a plurality of unidirectionally aligned, parallel fibers, wherein said layers are cross-plied at an angle, preferably a 90° angle, relative to a longitudinal fiber direction of each adjacent fiber layer; and wherein said fibers optionally have a polymeric matrix composition thereon; or ii) one or more layers comprising a plurality of randomly aligned fibers; and wherein said fibers optionally have a polymeric matrix composition thereon.

As is conventionally known in the art, non-woven fabrics achieve excellent ballistic resistance when the individual component fiber layers are cross-plied such that the fiber alignment direction of one layer is rotated at an angle with respect to the fiber alignment direction of another layer, such that they are non-parallel. For example, a preferred structure has two fiber layers of the invention positioned together such that the longitudinal fiber direction of one layer is perpendicular to the longitudinal fiber direction of the other layer. In another example, a five layered structure is formed in which the second, third, fourth and fifth layers are rotated +45°, −45°, 90° and 0°, with respect to the first layer, but not necessarily in that order. For the purposes of this invention, adjacent layers may be aligned at virtually any angle between about 0° and about 90° with respect to the longitudinal fiber direction of another layer, but the about 0° and about 90° fiber orientations are preferred. While the examples above illustrate fabrics that include either two or five individual fiber layers, such is not intended to be limiting. The non-woven fibrous layers can be constructed via a variety of well known methods, such as by the methods described in U.S. Pat. No. 6,642,159. It should be understood that the single-layer consolidated networks of the invention may generally include any number of cross-plied layers, such as about 20 to about 40 or more layers as may be desired for various applications.

The woven fibrous layers of the invention are also formed using techniques that are well known in the art using any fabric weave, such as plain weave, crowfoot weave, basket weave, satin weave, twill weave and the like. Plain weave is most common. Prior to weaving, the individual fibers of each woven fibrous material may or may not be coated with a polymeric matrix composition in a similar fashion as the non-woven fibrous layers using the same matrix compositions as the non-woven fibrous layers.

Alternately, the rubberized fabrics may comprise a hybrid combination of alternating or non-alternating woven and non-woven fibrous layers, such as a non-woven/woven/non-woven or woven/non-woven/woven structure. Adjacent layers are preferably joined via an intermediate adhesive layer. In the most preferred embodiment of the invention, the rubberized fabrics comprise from about 1 to about 20 combined woven and/or non-woven fibrous layers, most preferably from about 1 to about 15. These multiple layers are most preferably united (or consolidated) by molding under heat and pressure. Other alternate methods of bonding are well known in the art, and include stitching, quilting, bolting, adhering with adhesive materials, and the like.

The fibers useful in the ballistic resistant layers may be from about 50 denier to about 3000 denier. The selection is governed by considerations of ballistic effectiveness and cost. Finer yarns are more costly to manufacture and to weave, but can produce greater ballistic effectiveness per unit weight. The fibers are preferably from about 200 denier to about 3000 denier, more preferably from about 650 denier to about 1500 denier and most preferably from about 800 denier to about 1300 denier. For 1200 denier polyethylene fibers such as SPECTRA® 900 yarns produced by Honeywell International Inc., preferred woven fabrics are plain weave fabrics with about 15×15 ends/inch (about 5.9 ends/cm) to about 45×45 ends/inch (17.7 ends/cm) are preferred. More preferred are plain weave fabrics having from about 17×17 ends/inch (6.7 ends/cm) to about 23×23 ends/inch (9.0 ends/cm). For 650 denier SPECTRA® 900 polyethylene yarns, plain weave fabrics having from about 20×20 ends/inch (7.9 ends/cm) to about 40×40 ends/inch (16 ends/cm) are preferred. For 215 denier SPECTRA® 1000 polyethylene yarns, plain weave fabrics having from about 40×40 ends/inch (16 ends/cm) to about 60×60 ends/inch (24 ends/cm) are preferred. In the most preferred embodiment of the invention, the ballistic resistant fabrics of the invention comprise woven SPECTRA® fabric of fabric style 903 having a pick count of 21×21 ends/inch (ends/2.54 cm) and an areal weight of 7 oz/yd$^2$ (217 g/m$^2$ (gsm)). For superior ballistic performance, the individual fabric layers used herein also preferably have a compact cover percentage of at least about 75%, more preferably at least about 80% and most preferably at least about 85%. The compact cover percentage of a fabric layer can be defined as the amount of fiber coverage in a 1 inch (2.54 cm)×1 inch (2.54 cm) fabric area. For a fabric composed of 1200 denier fibers, the maximum number of fibers that can fit into a 1"×1" area is 24×24 in the warp and fill directions. The compact cover percentage is the percentage of fibers that fill the available fiber area. For example, woven fabric style 903 is comprised of 1200 denier fibers, S900 SPECTRA fibers, having a plain weave with a pick count of 21×21 ends/inch. Compared to a maximum of 24×24 ends/inch, fabric style 903 has a compact cover percent of 21 divided by 24, or approximately 87%. For woven fabrics, the tighter the weave, the higher the pick count. Fabrics with a looser weave, such as open mesh fabrics or scrims, have much lower pick counts. Fabric style 903 is distinguished from, for example, fabric style 902 which has a pick count of 17×17 and a compact cover percentage of about 71%. For the purposes of this invention, tightly woven fabrics are most preferred.

The woven or non-woven fibrous layers of the invention may be prepared using a variety of matrix materials, including both low modulus, elastomeric matrix materials and high modulus, rigid matrix materials. Suitable matrix materials non-exclusively include low modulus, elastomeric materials having an initial tensile modulus less than about 6,000 psi (41.3 MPa), and high modulus, rigid materials having an initial tensile modulus at least about 300,000 psi (2068 MPa), each as measured at 37° C. by ASTM D638. As used herein throughout, the term tensile modulus means the modulus of elasticity as measured by ASTM 2256 for a fiber and by ASTM D638 for a matrix material.

An elastomeric matrix composition may comprise a variety of polymeric and non-polymeric materials. The preferred elastomeric matrix composition comprises a low modulus elastomeric material. For the purposes of this invention, a low modulus elastomeric material has a tensile modulus, measured at about 6,000 psi (41.4 MPa) or less according to ASTM D638 testing procedures. Preferably, the tensile modulus of the elastomer is about 4,000 psi (27.6 MPa) or less, more preferably about 2400 psi (16.5 MPa) or less, more preferably 1200 psi (8.23 MPa) or less, and most preferably is about 500 psi (3.45 MPa) or less. The glass transition temperature (Tg) of the elastomer is preferably less than about 0° C., more preferably the less than about −40° C., and most preferably less than about −50° C. The elastomer also has an preferred elongation to break of at least about 50%, more preferably at least about 100% and most preferably has an elongation to break of at least about 300%.

A wide variety of matrix materials and formulations having a low modulus may be utilized as the matrix. Representative examples include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, and combinations thereof, and other low modulus polymers and copolymers curable below the melting point of the polyolefin fiber. Also preferred are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R-(BA)_x$ (x=3-150); wherein A is a block from a polyvinyl aromatic monomer and B is a block from a conjugated diene elastomer. Many of these polymers are produced commercially by Kraton Polymers of Houston, Tex. and described in the bulletin "Kraton Thermoplastic Rubber", SC-68-81. The most preferred matrix polymer comprises styrenic block copolymers sold under the trademark Kraton® commercially produced by Kraton Polymers. The most preferred low modulus matrix composition comprises a polystyrene-polyisoprene-polystrene-block copolymer.

Preferred high modulus, rigid matrix materials useful herein include materials such as a vinyl ester polymer or a styrene-butadiene block copolymer, and also mixtures of polymers such as vinyl ester and diallyl phthalate or phenol formaldehyde and polyvinyl butyral. A particularly preferred rigid matrix material for use in this invention is a thermosetting polymer, preferably soluble in carbon-carbon saturated solvents such as methyl ethyl ketone, and possessing a high tensile modulus when cured of at least about $1\times10^6$ psi (6895 MPa) as measured by ASTM D638. Particularly preferred rigid matrix materials are those described in U.S. Pat. No. 6,642,159, which is incorporated herein by reference.

The rigidity, impact and ballistic properties of the articles formed from the fabric composites of the invention are affected by the tensile modulus of the matrix polymer. For example, U.S. Pat. No. 4,623,574 discloses that fiber reinforced composites constructed with elastomeric matrices having tensile moduli less than about 6000 psi (41,300 kPa) have superior ballistic properties compared both to composites constructed with higher modulus polymers, and also compared to the same fiber structure without a matrix. However, low tensile modulus matrix polymers also yield lower rigidity composites. Further, in certain applications, particularly those where a composite must function in both anti-ballistic and structural modes, there is needed a superior combination of ballistic resistance and rigidity. Accordingly, the most appropriate type of matrix polymer to be used will vary depending on the type of article to be formed from the fabrics of the invention. In order to achieve a compromise in both properties, a suitable matrix composition may combine both low modulus and high modulus materials to form a single matrix composition.

The ballistic resistant fabrics of the invention have two outer surfaces, said fabrics being rubberized either by attaching a vulcanized rubber sheet onto at least one surface of the fabric, or by applying an unvulcanized rubber composition onto the fabric surface or surfaces followed by vulcanizing. A vulcanized rubber sheet may be attached to the fabric surface by various methods, such as by lamination via an intermediate adhesive layer. In the preferred embodiment of the invention, a vulcanized rubber sheet is attached by molding under the conditions described below. In this embodiment, the vulcanized rubber may be attached to a pre-molded fabric composite, or may be is attached to a fabric which has not yet been molded. Preferably, the vulcanized rubber is joined with an unmolded stack of fibrous layers in a single molding step to form a rubberized fabric composite. Suitable materials for said intermediate adhesive layer non-exclusively include elastomeric materials such as polyethylene, cross-linked polyethylene, chlorosulfonated polyethylene, ethylene copolymers, polypropylene, propylene copolymers, polybutadiene, polyisoprene, natural rubber, ethylene-propylene copolymers, ethylene-propylene-diene terpolymers, polysulfide polymers, polyurethane elastomers, polychloroprene, plasticized polyvinylchloride using one or more plasticizers that are well known in the art (such as dioctyl phthalate), butadiene acrylonitrile elastomers, poly (isobutylene-co-isoprene), polyacrylates, polyesters, unsaturated polyesters, polyethers, fluoroelastomers, silicone elastomers, copolymers of ethylene, thermoplastic elastomers, phenolics, polybutyrals, epoxy polymers, styrenic block copolymers, such as styrene-isoprene-styrene or styrene-butadiene-styrene types, and other suitable adhesive compositions conventionally known in the art. Particularly preferred adhesive compositions include methacrylate adhesives, cyanoacrylate adhesives, UV cure adhesives, urethane adhesives, epoxy adhesives, ethylene vinyl acetate adhesives and blends of the above materials. Most preferably, the adhesive comprises a thermoplastic polymer, particularly ethylene vinyl acetate. Such adhesives may be applied, for example, in the form of a hot melt, film, paste or spray, or as a two-component liquid adhesive. In general, an intermediate adhesive layer is also required when combining multiple fibrous layers. However, if the fibers forming the fibrous layers are coated with a matrix composition, as described above, an intermediate adhesive layer is optional.

In the preferred embodiment of the invention, an unvulcanized rubber is applied onto a ballistic resistant fabric of the invention and the coated fabric is thereafter vulcanized during a pressure molding step in which the coated fabric is molded into its ultimately desired form under pressure. The rubber composition may be applied to one or more surfaces of each individual fibrous layer forming the fabric, or only onto a single surface of a single fibrous layer. Most preferably, the rubberized fabrics of the invention comprise a plurality of fabrics, wherein a layer of rubber is positioned between each adjacent fabric sheet, and wherein each fabric sheet comprises one or more woven and/or non-woven fibrous layers. The resulting rubberized fabrics are flexible composites having a stiffness of at least about 10 ksi as measured by ASTM D790.

When an unvulcanized rubber composition is applied to a fabric, the rubber composition comprises at least one unvulcanized natural and/or synthetic rubber, at least one vulcanizing agent and optionally a solvent, which unvulcanized rubber composition is subsequently vulcanized under heat and pressure conditions sufficient to substantially vulcanize the rubber composition. Naturally occurring rubbers are homologues of either polyisoprene or isoprene. Synthetic rubbers may be made of materials such as polyurethane, neoprene, polybutadiene, styrene butadiene, or styrene polybutadiene as is well known in the art. Also suitable are combinations of different synthetic rubbers, as well as combinations of synthetic and natural rubbers. These lists of natural and synthetic rubbers are non-exclusive, with any natural or synthetic rubber or combination thereof being useful herein. Suitable vulcanizing agents non-exclusively include sulfur, peroxide or a metal oxide, such as zinc oxide, lead oxide or iron oxide ($Fe_2O_3$), as is well known in the art. The vulcanization agent may alternately comprise a suitable radiation cure system. Suitable solvents in which the unvulcanized rubber and vulcanizing agent may be dispersed non-exclusively include toluene, trichlorobenzene, tetrahydrofuran, orthodichlorobenzene, cumene, naphthalene, methylene chloride or xylene. This list of solvents is non-limiting and other suitable solvents may be employed. Natural rubber and polyisoprene, as well as other synthetic rubbers, are also available as water-based dispersions, or latexes. For such water-based dispersions, rather than being dissolved and dispersed in a solvent, the polymer is emulsified, suspended or otherwise dispersed in the water.

The unvulcanized rubber composition is preferably applied to the fabric surface by any suitable means, and preferably by coating. Vulcanizing techniques are well known in the art and involve the application of heat. The application of heat together with the vulcanization agent causes the formation of cross-linkages between the polymer chains of the rubber molecules. The vulcanization step is preferably conducted at a temperature of from at least about 115° C. to less than about 290° C., more preferably from about 115° C. to about 240° C., more preferably at a temperature less than 150° C., most preferably from at least about 115° C. to less than about 146° C. Importantly, the vulcanization is conducted at a temperature below the melting point of the polyolefin fibers. Vulcanization may also be conducted with optional additives, such as accelerators and/or retarding agents.

Preferably, a vulcanized rubber sheet is attached to a fabric by molding, which is described below, where preferably the fabric has not yet been molded. Alternately, the vulcanized rubber sheet may be attached to a pre-molded fabric.

In the preferred embodiment of the invention, the rubber coated fabric is vulcanized through the application of heat during a pressure molding step in which the coated fabric is molded into its ultimately desired form under pressure. In the preferred embodiment of the invention, the fabric is molded at a pressure of from about 50 psi to about 5000 psi, more preferably about 200 psi to about 1500 psi, most preferably from about 400 psi to about 1000 psi. The fabric may alternately be molded at higher pressures of from about 500 psi to about 5000 psi, more preferably from about 1000 psi to about 5000 psi and more preferably from about 2000 psi to about 5000 psi. The molding step may take from about 4 seconds to about 45 minutes. Molding temperatures range from about 80° C. to about 146° C., more preferably from about 100° C. to about 127° C. In the event that a pre-vulcanized rubber sheet is attached to the fabric, preferably with an intermediate adhesive layer, it is most preferred that the multiple fibrous layers comprising the ballistic resistant fabric are joined together in a single molding step with said rubber layer. In the preferred embodiments of the invention, the molding step further serves the additional function of consolidating all of the individual layers of the invention. For example, the molding step may serve to consolidate a plurality of cross-plied, non-woven fiber layers forming a consolidated network as described above, in addition to consolidating a rubber layer with said fiber layers.

In an alternate embodiment of the invention, additional rubber layers may be attached or applied onto other fabric surfaces. Moreover, one or more additional fibrous layers or fabrics may optionally be attached to said rubberized fabrics. However, in the preferred embodiment of the invention, a rubber layer comprises at least one of the outermost surfaces of the rubberized fabrics of the invention.

It has been found that the pressure under which the rubberized fabrics of the invention are molded has a direct effect on the stiffness of the resulting molded product. Particularly, the higher pressure at which the rubberized fabrics are molded, the higher the stiffness, and vice-versa. Most preferably, the rubberized fabrics of the invention are molded at high pressures. In addition to the molding pressure, the quantity, thickness and composition of both the rubber and fabric layers also directly affects the stiffness of the articles formed from the inventive rubberized fabrics. Preferably, the vulcanized, rubberized fabrics of the invention have a stiffness of at least about 10 ksi, preferably from about 10 ksi to about 2000 ksi, more preferably from about 20 ksi to about 500 ksi, more preferably from about 20 ksi to about 250 ksi, more preferably from about 20 ksi to about 100 ksi; about 20 ksi to about 75 ksi; and more preferably about 25 ksi to about 55 ksi, as measured by the three point test method of ASTM D790. When utilizing a low modulus matrix, the rubberized fabrics are preferably stiff enough to have good structural integrity while remaining flexible enough to be folded, bent or rolled and capable of being cut with a pair of scissors. Further, depending on the ultimate use, the rubberized fabrics of the invention may optionally be calendared under heat and pressure to smooth or polish their surfaces. The fabrics of the invention may also or alternately be calendared prior to molding with rubber.

In a preferred embodiment of the invention, the rubber composition is applied onto one or both outermost surfaces of the at least one fabric layer. In an alternate embodiment, multiple fabrics may be incorporated and the rubber composition may be applied to one or both outermost surfaces of the composite structure, and the rubber composition may be also or alternately be applied to one or more intermediate surfaces wherein a rubber layer is surrounded on either side by one or more woven or non-woven fibrous layers. In this embodiment, second fabric layer may be attached to a first rubberized fabric layer after or prior to vulcanizing an unvulcanized rubber composition. Furthermore, in accordance with the invention, it is particularly intended that the rubber composition is present on a surface of the component fabric layers, wherein the individual fibers forming the fabric layers are not embedded within or encapsulated by the rubber composition. It is preferred that, at most, the rubber composition is applied only onto less than 100% of the surface area of any individual fiber.

In the preferred embodiment of the invention, the proportion of fiber preferably comprises from about 50% to about 95% by weight of the composite, more preferably from about 60% to about 90% by weight of the composite, and most preferably from about 70% to about 85% by weight of the composite. The remaining portion of the composite is a combination of the rubber composition and the optional matrix composition. In the preferred embodiment of the invention, the vulcanized rubber composition preferably comprises from about 10% to about 60% by weight of the composite, more preferably from about 10% to about 35% by weight of the composite, and most preferably from about 15% to about 25% by weight of the composite. Preferably, the optional matrix composition comprises from about 1% to about 30% by weight of the composite, more preferably from about 2% to about 20% by weight of the composite, and most preferably from about 5% to about 20% by weight of the composite. As used herein, the term "composite" refers to a combination of the fibers, optional matrix composition, and vulcanized rubber composition. Both the rubber composition and the matrix composition may also include fillers such as carbon black or silica, may be extended with oils, or may be combined with other optional additives as is conventional in the art, such as anti-oxidant agents or surfactants. Rubber fillers may improve abrasion resistance, increase viscosity, act as a UV blocker, and may reduce the cost of the rubber.

The thickness of the individual fabric layers will correspond to the thickness of the individual fibers. In the preferred embodiments of the invention, prior to being rubberized, preferred woven or non-woven fibrous layers will have a thickness of from about 25 μm to about 1000 μm, more preferably from about 50 μm to about 750 μm and most preferably from about 75 μm to about 500 μm. Preferably, the thickness of the rubber layer or layers is from about 25 μm to about 1000 μm, more preferably from about 35 μm to about 500 μm and most preferably from about 50 μm to about 400 μm. In the preferred embodiments of the invention, the rubberized fabrics of the invention will have a thickness of from about 50 μm to about 1050 μm, more preferably from about 75 μm to about 650 μm and most preferably from about 85 μm to about 400 µm. While such thicknesses are preferred, it is to be understood that other film thicknesses may be produced to satisfy a particular need and yet fall within the scope of the present invention. Additionally, forming the rubberized fabrics by molding under pressure may reduce the overall thickness of the rubberized fabrics, causing the thickness of the final rubberized fabric to be less than the sum of the thicknesses of its individual component layers. For example, molding pressures may cause the rubber composition to move into open spaces between fibers, reducing the total rubberized fabric thickness. Additionally, while a minimum fabric thickness of 25 µm may be useful to slow down the velocity of a ballistic threat, this thickness is not sufficient to stop a bullet. In general, a fabric thickness (not including the rubber layer thickness) of about 0.006" (152.4 µm) or greater is preferred to stop a 9 mm full metal jacket (FMJ) bullet under standard testing conditions, and preferably includes 12 or more woven fibrous layers, 12 or more non-woven 0°/90° fibrous layers or a combination thereof. Increased thicknesses are preferred for greater ballistic resistance with the drawback of increased fabric weight. The rubberized molded fabrics of the invention further have a preferred areal density of from about 0.25 lb/ft² (psf) (1.22 kg/m² (ksm)) to about 2.0 psf (9.76 ksm), more preferably from about 1.0 psf (4.88 ksm) to about 1.5 psf (7.32 ksm), more preferably from about 1.1 psf (5.37 ksm) to about 1.5 psf, and most preferably from about 1.1 psf to about 1.25 psf (6.1 ksm).

The rubberized fabrics of the invention may be used for various applications. The ultimately desired form of the rubberized fabrics may be a flat, planar panel or a customized shape, such as a curved panel. Such fabrics may be used, for example, to fortify armored civilian vehicles for NIJ Level I, IIA, II, IIIA and III protection; as armored doors and roofs for police cars and other vehicles; as trauma pads or breast plate inserts for ballistic resistant vests for NIJ Level I, IIA, II, IIIA and III protection; for hand-held riot shields at NIJ Level I, IIA, II, IIIA and III protection, or for explosion management devices. The fabrics of the invention may also be used for the formation or fortification of structures such in hose or cord structures, coast guard buoys, tires and other mechanical rubber goods, in addition to traditional rubberized fabric applications. Additionally, the rubberized fabrics of the invention may be used to add structural and ballistic support to existing structures, such as by attaching said fabrics to structural panels of armored vehicles.

Depending on the desired structural and ballistic resistance properties of the articles formed from the rubberized fabrics of the invention, various parameters such as the number and type of fabric layers and the type of matrix may be controlled. For example, for the formation of low cost trauma pads for reducing deformation in ballistic resistant vests, it is preferred to include 2 fabric layers, i.e. two woven fibrous layers, or two single layer, consolidated networks of non-woven, unidirectional fibers, each formed from two fiber layer plies cross-plied at 0°/90°, having a rubber layer on either outer surface of the combined fabric. Further, for ballistic resistant panels having a ballistic protection level of NIJ Level II or IIA, fabrics including 14 fabric layers and 10 fabric layers, respectively, are preferred, each having a rubber layer on either outer surface of the combined fabric.

The ballistic resistance properties of the inventive fabrics are determined using standard testing procedures that are well known in the art. For example, screening studies of ballistic composites commonly employ a 22 caliber, non-deforming steel fragment of specified weight, hardness and dimensions (Mil-Spec.MIL-P-46593A(ORD)).

The protective power or penetration resistance of a structure is normally expressed by citing the impacting velocity at which 50% of the projectiles penetrate the composite while 50% are stopped by the shield, also known as the $V_{50}$ value. As used herein, the "penetration resistance" of the article is the resistance to penetration by a designated threat, such as physical objects including bullets, fragments, shrapnels and the like, and non-physical objects, such as a blast from explosion. For composites of equal areal density, which is the weight of the composite panel divided by the surface area, the higher the $V_{50}$, the better the resistance of the composite. The ballistic resistant properties of the fabrics of the invention will vary depending on many factors, particularly the type of fibers used to manufacture the fabrics.

The following non-limiting examples serve to illustrate the invention.

Example 1

A rubberized, woven SPECTRA® fabric (fabric style 903; plain weave; pick count: 21×21 ends/inch (2.54 cm); areal weight: 7 oz/yd² (217 gsm)) was formed under low pressure molding conditions. The woven SPECTRA® fabric was coated with natural rubber for 10 minutes at 270° F. (132.2° C.) in a match-die mold, followed by applying 200 psi molding pressure for 10 minutes, and thereafter was cooled to 90° F. (32.22° C.) under the same pressure. The overall rubberized fabric had a total rubber content of 34% by weight and a total fiber content of 66% by weight.

This is compared to a molded SPECTRA® fabric of the same thickness coated with vinyl ester thermosetting polymer. See the data summarized in Table 1 and Table 2. This Example shows that a molded, rubberized SPECTRA® fabric has higher 17 grain Fragment ballistic resistance (SEAT is Specific Energy Absorption of Target, unit is (J·m²/kg)) as a molded SPECTRA® fabric of the same thickness coated with vinyl ester polymer.

TABLE 1

Control: 17 grain FSP Fragment Performance of molded SPECTRA ® fabric style 903 coated with vinyl ester resin

| Material | Layers | Areal Density (psf) | Molding Pressure (psi) | Thickness (inch) | $V_{50}$ (fps) | SEAT (J·m²/kg) |
|---|---|---|---|---|---|---|
| SPECTRA ®/Vinylester | 16 | 1.00 (4.88 ksm) | 900 (43 KPa) | 0.18 (4.6 mm) | 1527 (465 mps) | 24.25 |

TABLE 2

17 grain FSP Fragment Performance of molded SPECTRA ®/rubber panels

| Ex. # | Material | Layers | Areal Density (psf) | Molding Pressure (psi) | Thickness (inch) | $V_{50}$ (fps) | SEAT ($J \cdot m^2/kg$) |
|---|---|---|---|---|---|---|---|
| 1 | SPECTRA ®/rubber | 10 | 0.75 (3.66 ksm) | 200 (9.5 KPa) | 0.188 (4.8 mm) | 1334 (407 mps) | 29.37 |
| 2 | SPECTRA ®/rubber | 10 | 0.75 (3.66 ksm) | 1500 (71.8 KPa) | 0.131 (3.3 mm) | 1326 (404 mps) | 29.02 |

Example 2

A rubberized, woven SPECTRA® fabric (fabric style 903; plain weave; pick count: 21×21 ends/inch (2.54 cm); areal weight: 7 oz/yd² (217 gsm)) was formed under high pressure molding conditions. The woven SPECTRA® fabric was coated with natural rubber for 10 minutes at 270° F. (132.2° C.) in a match-die mold, followed by applying 1500 psi molding pressure for 10 minutes, and thereafter was cooled to 90° F. (32.22° C.) under the same pressure. The overall rubberized fabric had a total rubber content of 34% by weight and a total fiber content of 66% by weight.

This Example shows that a molded, rubberized SPECTRA® fabric has higher 17 grain Fragment ballistic resistance (SEAT is Specific Energy Absorption of Target, unit is ($J \cdot m^2/kg$)) compared to a molded SPECTRA® fabric of the same thickness coated with vinyl ester polymer.

A rubberized, woven SPECTRA® fabric (fabric style 903; plain weave; pick count: 21×21 ends/inch (2.54 cm); areal weight: 7 oz/yd² (217 gsm)) was formed under low pressure molding conditions. The woven SPECTRA® fabric was coated with natural rubber for 10 minutes at 270° F. (132.2° C.) in a match-die mold, followed by applying 200 psi molding pressure for 10 minutes, and thereafter was cooled to 90° F. (32.22° C.) under the same pressure. The overall rubberized fabric had a total rubber content of 34% by weight and a total fiber content of 66% by weight.

This is compared to a molded SPECTRA® fabric of the same thickness coated with vinyl ester polymer. See the data summarized in Table 1 and Table 2. This Example shows that a molded, rubberized SPECTRA® fabric has higher 17 grain Fragment ballistic resistance (SEAT) compared to a molded SPECTRA® fabric of the same thickness coated with vinyl ester polymer.

Example 3

The fabric of Example 1 was tested for ballistic resistance against a 9 mm FMJ bullet resistance and compared to a molded SPECTRA® fabric of the same thickness coated with vinyl ester polymer, as in Example 1. See the data summarized in Table 3 and Table 4. This Example shows that a molded, rubberized SPECTRA® fabric has higher 9 mm FMJ bullet resistance (SEAT) compared to the SPECTRA® fabric coated with vinyl ester polymer.

TABLE 3

Control: 9 mm FMJ bullet Performance of Molded SPECTRA ® fabric style 903 coated with vinyl ester resin

| Material | Layers | Areal Density (psf) | Molding Pressure (psi) | Thickness (inch) | $V_{50}$ (mps) | SEAT ($J \cdot m^2/kg$) | Backface Deformation (mm) |
|---|---|---|---|---|---|---|---|
| SPECTRA ®/Vinylester | 16 | 1.00 (4.88 ksm) | 900 (43 KPa) | 0.18 (4.6 mm) | 472 | 181 | 12 |

Example 4

The fabric of Example 2 was tested for ballistic resistance against a 9 mm FMJ bullet resistance and compared to a molded SPECTRA® fabric of the same thickness coated with vinyl ester polymer, as in Example 2. See the data summarized in Table 3 and Table 4. This Example shows that a molded, rubberized SPECTRA® fabric has higher 9 mm FMJ bullet resistance (SEAT) compared to the SPECTRA® fabric coated with vinyl ester polymer.

TABLE 4

9 mm FMJ bullet Performance of Molded SPECTRA ®/rubber panels

| Material | Layers | Areal Density (psf) | Molding Pressure (psi) | Thickness (inch) | $V_{50}$ (fps) | SEAT ($J \cdot m^2/kg$) | Backface Deformation (mm) |
|---|---|---|---|---|---|---|---|
| SPECTRA ®/Rubber | 10 | 0.75 (3.6 ksm) | 1500 (72 KPa) | 0.131 (3.3 mm) | 980 (299 mps) | 96.8 | 18 |
| SPECTRA ®/Rubber | 20 | 1.51 (7.4 ksm) | 1500 (72 KPa) | 0.262 (6.6 mm) | 1360 (415 mps) | 92.7 | 23 |

Example 5

This Example tests additional properties of the fabric samples from Examples 1-4. Particularly, this Example illustrates that the flexibility (or stiffness) of rubberized SPECTRA® fabric is a function of molding pressure. The higher the pressure at which the panel is molded, the higher the stiffness, and vice-versa. The Example also illustrates the significantly higher stiffness of a SPECTRA® fabric coated with a vinyl ester resin instead of rubber. The deflection data represents the flexibility of the SPECTRA®/rubber composite compared to the relatively stiff SPECTRA®/vinyl ester system under load.

TABLE 5

Flexibility of Materials under flexural loading (ASTM D790).

| Material | Layers | Areal Density (psf) | Molding Pressure (psi) | Thickness (inch) | Stiffness (Flexural Modulus) (ksi) | Deflection (inch) |
|---|---|---|---|---|---|---|
| SPECTRA ®/ Vinyl ester | 16 | 1.00 (4.88 ksm) | 900 (43 KPa) | 0.18 (4.6 mm) | 759 (3.30 MN) | 0.31 (7.8 mm) |
| SPECTRA ®/ Rubber | 10 | 0.75 (3.66 ksm) | 200 (9.5 KPa) | 0.17 (4.3 mm) | 22 (0.09 MN) | 0.65 (16.5 mm) |
| SPECTRA ®/ Rubber | 10 | 0.75 (3.66 ksm) | 1500 (72 KPa) | 0.15 (3.8 mm) | 52 (0.22 MN) | 0.65 (16.5 mm) |

These examples illustrate that SPECTRA®/rubber composites are flexible compared to SPECTRA®/vinyl ester composites. The rubberized fabrics of the invention are therefore suitable for armor applications, such as civilian and military vehicle doors, roofs, floors and other vehicle parts where flexible armor composites are desired. The composites are also cheaper than the alternative, reducing installation and other costs.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A rubberized, molded ballistic resistant fabric comprising a plurality of woven fibrous layers comprising polyolefin fibers or a plurality of non-woven fibrous layers comprising polyolefin fibers, or a combination of at least one woven fibrous layer and at least one non-woven fibrous layer of polyolefin fibers; said fabric having a stiffness of from about 20 ksi to about 500 ksi as measured by ASTM D790; and said polyolefin fibers having a tenacity of about 7 g/denier or more and a tensile modulus of about 150 g/denier or more; said fabric having a vulcanized rubber composition attached or applied to at least one surface thereof; wherein the fibers forming the fibrous layers are not embedded within or encapsulated by the rubber composition, wherein the rubber composition is applied onto less than 100% of the surface area of said fibers, and
    wherein said rubberized, molded ballistic resistant fabric is produced by molding the fibrous layers together at a pressure of from about 200 psi to about 5000 psi.

2. The rubberized, molded ballistic resistant fabric of claim 1 wherein said vulcanized rubber composition is on each surface of said at least one fabric layer, and wherein said fabric does not include a matrix composition.

3. The rubberized, molded ballistic resistant fabric of claim 1 which comprises at least one woven fibrous layer in a matrix composition that binds said polyolefin fibers together.

4. The rubberized, molded ballistic resistant fabric of claim 1 which comprises at least one non-woven fibrous layer in a matrix composition that binds said polyolefin fibers together.

5. The rubberized, molded ballistic resistant fabric of claim 1 which comprises a plurality of non-woven fibrous layers, each layer comprising a plurality of unidirectionally aligned, parallel fibers, wherein said layers are cross-plied at an angle relative to a longitudinal fiber direction of each adjacent fiber layer.

6. The rubberized, molded ballistic resistant fabric of claim 1 which comprises a plurality of non-woven fibrous layers, each layer comprising a plurality of randomly aligned fibers.

7. The rubberized, molded ballistic resistant fabric of claim 1 which comprises both at least one woven fibrous layer and at least one non-woven fibrous layer and a matrix composition that binds said polyolefin fibers together.

8. A The rubberized, molded ballistic resistant fabric of claim 1
    wherein said plurality of non-woven fibrous layers, or said combination of at least one woven fibrous layer and at least one non-woven fibrous layer are in a matrix composition that binds said polyolefin fibers together, wherein the matrix composition comprises a block copolymer of a conjugated diene and a vinyl aromatic monomer.

9. The rubberized, molded ballistic resistant fabric of claim 8 wherein the matrix composition comprises polystyrene-polyisoprene-polystyrene-block copolymer.

10. The rubberized, molded ballistic resistant fabric of claim 1 wherein said fabric has an areal density of from about 4.88 kg/m$^2$ to about 7.32 kg/m$^2$.

11. The rubberized, molded ballistic resistant fabric of claim 1 wherein said fabric has a stiffness of from about 20 ksi to about 75 ksi as measured by ASTM D790.

12. The rubberized, molded ballistic resistant fabric of claim 1 wherein said fabric has a stiffness of from about 25 ksi to about 55 ksi as measured by ASTM D790.

13. The rubberized, molded ballistic resistant fabric of claim 1 wherein said fabric has an areal density of from about 1.22 kg/m$^2$ to about 9.76 kg/m$^2$.

14. The rubberized, ballistic resistant fabric of claim 8 wherein said fabric has an areal density of from about 1.22 kg/m$^2$ to about 9.76 kg/m$^2$.

15. An article comprising the rubberized, ballistic resistant fabric of claim 8 wherein said fabric has an areal density of from about 4.88 kg/m$^2$ to about 7.32 kg/m$^2$.

16. A method of forming a rubberized, ballistic resistant fabric comprising:
  i) applying a layer of an unvulcanized rubber composition onto at least one surface of a ballistic resistant fabric, said fabric comprising a plurality of woven fibrous layers comprising polyolefin fibers or a plurality of non-woven fibrous layers comprising polyolefin fibers, or a combination of at least one woven fibrous layer and at least one non-woven fibrous layer of polyolefin fibers; said polyolefin fibers having a tenacity of about 7 g/denier or more and a tensile modulus of about 150 g/denier or more;
  ii) molding said fabric under sufficient heat and at a pressure of from about 200 psi to about 5000 psi to vulcanize said rubber composition and to produce a rubberized fabric having a stiffness of from about 20 ksi to about 500 ksi as measured by ASTM D790; wherein the fibers forming the fibrous layers are not embedded within or encapsulated by the rubber composition, wherein the rubber composition is applied onto less than 100% of the surface area of said fibers; and wherein said rubberized, molded ballistic resistant fabric is produced by molding the fibrous layers together at a pressure of from about 200 psi to about 5000 psi.

17. The method of claim 16 wherein said rubber composition is applied to each surface of said fabric.

18. The method of claim 16 wherein said unvulcanized rubber composition comprises at least one unvulcanized rubber, at least one vulcanizing agent and optionally a solvent.

19. The method of claim 16 wherein said unvulcanized rubber composition is vulcanized at a temperature of less than about 150° C.

20. The method of claim 18 wherein said vulcanizing agent comprises sulfur, a peroxide or a metal oxide.

21. The method of claim 18 wherein said solvent is present and comprises toluene, trichlorobenzene, tetrahydrofuran, orthodichlorobenzene, cumene, naphthalene, methylene chloride or xylene.

22. The method of claim 16 further comprising attaching at least one additional ballistic resistant fabric to said unvulcanized rubber layer prior to said vulcanization step.

23. The method of claim 16 wherein said fabric comprises at least one woven fibrous layer.

24. The method of claim 16 wherein said fabric comprises at least one non-woven fibrous layer.

25. The method of claim 16 wherein said fabric comprises a plurality of non-woven fibrous layers, each layer comprising a plurality of unidirectionally aligned, parallel fibers, wherein said layers are cross-plied at a 90° angle relative to a longitudinal fiber direction of each adjacent fiber layer; and wherein said fibers optionally have a polymeric matrix composition thereon.

26. The method of claim 16 wherein said fabric comprises a plurality of non-woven fibrous layers, each layer comprising a plurality of randomly aligned fibers; and wherein said fibers optionally have a polymeric matrix composition thereon.

27. The method of claim 16 wherein said fabric comprises both at least one woven fibrous layer and at least one non-woven fibrous layer.

28. The method of claim 16 wherein said molded, rubberized fabric has a stiffness of from about 20 ksi to about 75 ksi as measured by ASTM D790.

29. The method of claim 16 wherein said molded, rubberized fabric has a stiffness of from about 25 ksi to about 55 ksi as measured by ASTM D790.

30. The method of claim 16 wherein said fabric is molded at a pressure of from about 500 psi to about 5000 psi.

31. The method of claim 16 wherein said molded, rubber composition comprises from about 10% to about 60% by weight of said rubberized fabric.

32. The method of claim 16 further comprising attaching said rubberized, ballistic resistant fabric to an article.

33. The method of claim 16 wherein said polyolefin fibers comprise polyethylene fibers.

34. An article formed by the method of claim 16.

35. A method of forming a rubberized, ballistic resistant fabric comprising:
  i) positioning a vulcanized rubber layer onto at least one surface of a ballistic resistant fabric, said fabric comprising a plurality of woven fibrous layers comprising polyolefin fibers or a plurality of non-woven fibrous layers comprising polyolefin fibers, or a combination of at least one woven fibrous layer and at least one non-woven fibrous layer of polyolefin fibers; said polyolefin fibers having a tenacity of about 7 g/denier or more and a tensile modulus of about 150 g/denier or more; and either ii)A) or ii)B):
  ii)A) molding said fabric under sufficient heat and at a pressure of from about 200 psi to about 5000 psi to attach said vulcanized rubber layer to said ballistic resistant fabric and to thereby produce a rubberized fabric having a stiffness of from about 20 ksi to about 500 ksi as measured by ASTM D790; and wherein the fibers forming the fibrous layers are not embedded within or encapsulated by the rubber composition, wherein the rubber composition is applied onto less than 100% of the surface area of said fibers;
  ii)B) wherein the ballistic resistant fabric is molded at a pressure of from about 200 psi to about 5000 psi prior to positioning the vulcanized rubber layer onto at least one surface of said ballistic resistant fabric, wherein said rubberized, molded fabric has a stiffness of from about 20 ksi to about 500 ksi as measured by ASTM D790; and wherein the fibers forming the fibrous layers are not embedded within or encapsulated by the rubber composition, wherein the rubber composition is applied onto less than 100% of the surface area of said fibers.

36. The method of claim 35 wherein said vulcanized rubber layer is attached to at least one surface of said fabric via an intermediate adhesive layer.

37. The method of claim 35 wherein said vulcanized rubber layer is attached to each surface of said fabric via an intermediate adhesive layer.

38. The method of claim 35 further comprising attaching at least one additional ballistic resistant fabric to said vulcanized rubber layer.

39. The method of claim 35 wherein step ii)A) is conducted.

40. The method of claim 35 wherein step ii)B) is conducted.

41. The method of claim 35 wherein said fabric comprises a plurality of non-woven fibrous layers, each layer comprising a plurality of unidirectionally aligned, parallel fibers, wherein said layers are cross-plied at a 90° angle relative to a longitudinal fiber direction of each adjacent fiber layer; and wherein said fibers optionally have a polymeric matrix composition thereon.

42. The method of claim 35 wherein said fabric comprises a plurality of non-woven fibrous layers, each layer comprising a plurality of randomly aligned fibers;
  and wherein said fibers optionally have a polymeric matrix composition thereon.

43. The method of claim 35 wherein said fabric comprises both at least one woven fibrous layer and at least one non-woven fibrous layer.

44. The method of claim 35 wherein said molded, rubberized fabric has a stiffness of from about 20 ksi to about 75 ksi as measured by ASTM D790.

45. The method of claim 35 wherein said molded, rubberized fabric has a stiffness of from about 25 ksi to about 55 ksi as measured by ASTM D790.

46. The method of claim 35 wherein said fabric is molded at a pressure of from about 500 psi to about 5000 psi.

47. The method of claim 35 wherein said rubber layer comprises from about 10% to about 60% by weight of said fabric.

48. The method of claim 35 further comprising attaching said rubberized, ballistic resistant fabric to an article.

49. The method of claim 35 wherein said polyolefin fibers comprise polyethylene fibers.

50. The method of claim 39 wherein said ballistic resistant fabric is calendared prior to said molding step.

51. An article formed by the method of claim 35.

52. The rubberized, molded ballistic resistant fabric of claim 1 wherein said fabric does not include a matrix composition and has a stiffness of from about 20 ksi to about 75 ksi as measured by ASTM D790.

53. The rubberized, molded ballistic resistant fabric of claim 1 wherein said fabric does not include a matrix composition and has a stiffness of from about 25 ksi to about 55 ksi as measured by ASTM D790.

* * * * *